No. 695,207. Patented Mar. 11, 1902.
J. D. GRIFFEN.
RUNNING GEAR FOR MOTOR VEHICLES.
(Application filed Nov. 26, 1901.)
(No Model.) 3 Sheets—Sheet 1.
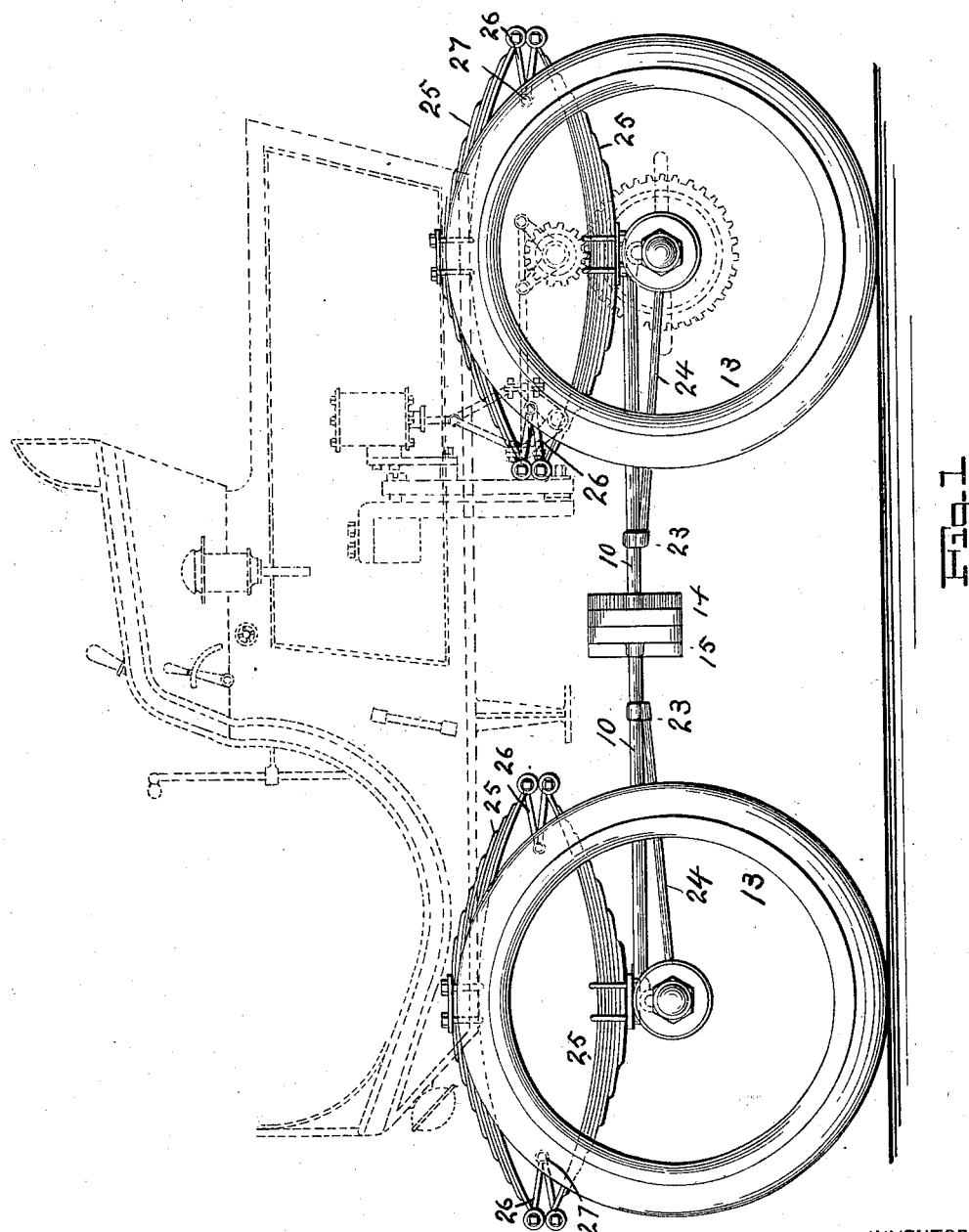
WITNESSES:
INVENTOR
John D. Griffen,
BY
W. B. Hutchinson,
ATTORNEY

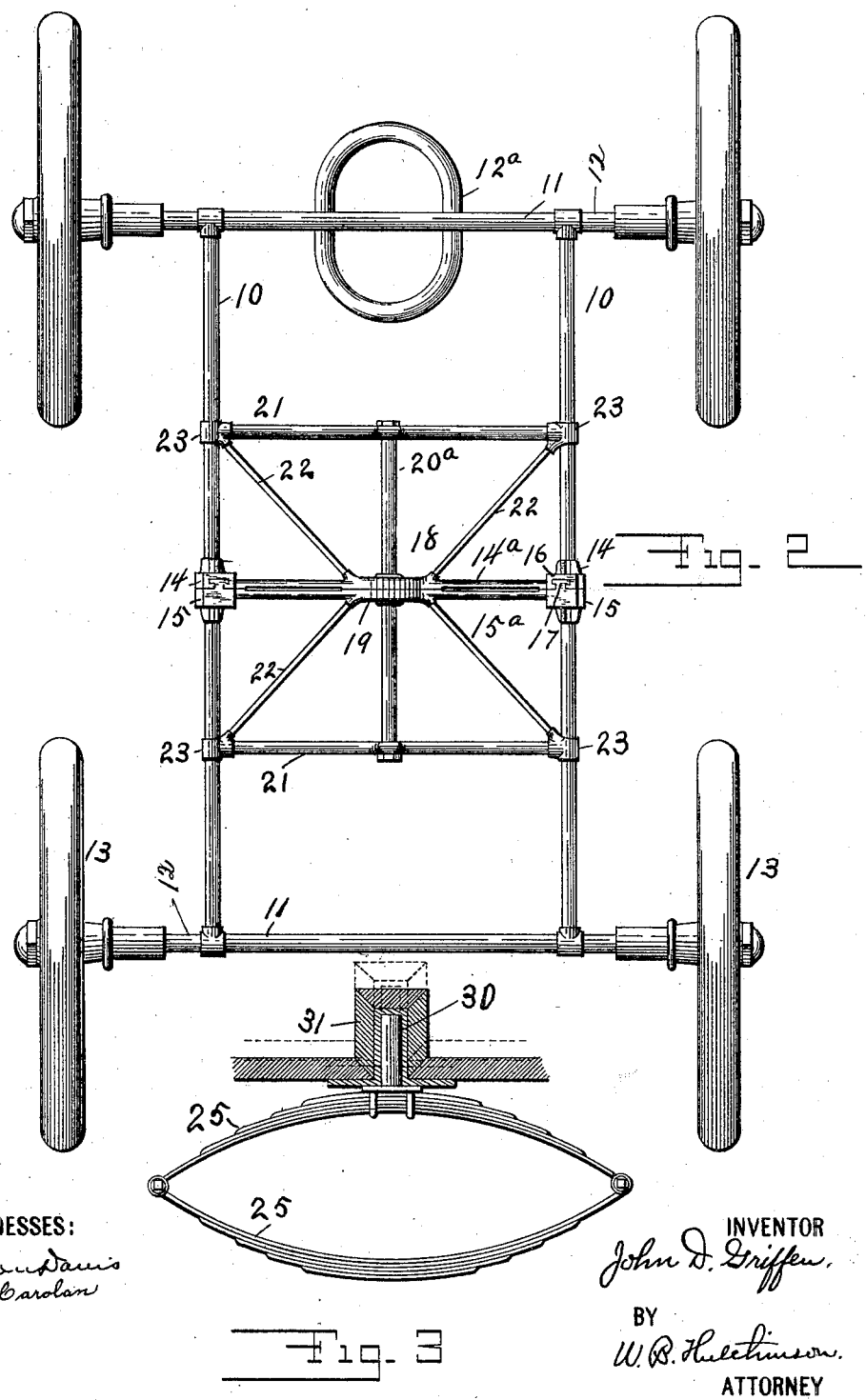

No. 695,207. Patented Mar. 11, 1902.
J. D. GRIFFEN.
RUNNING GEAR FOR MOTOR VEHICLES.
(Application filed Nov. 26, 1901.)

(No Model.) 3 Sheets—Sheet 3.

WITNESSES:

INVENTOR
John D. Griffen
BY
W. B. Hutchinson
ATTORNEY

UNITED STATES PATENT OFFICE.

JOHN D. GRIFFEN, OF NEW YORK, N. Y., ASSIGNOR TO STANDARD POWER COMPANY, OF NEW YORK, N. Y., A CORPORATION OF NEW YORK.

RUNNING-GEAR FOR MOTOR-VEHICLES.

SPECIFICATION forming part of Letters Patent No. 695,207, dated March 11, 1902.

Application filed November 26, 1901. Serial No. 83,799. (No model.)

*To all whom it may concern:*

Be it known that I, JOHN D. GRIFFEN, of the city, county, and State of New York, have invented certain new and useful Improvements in Running-Gear for Motor-Vehicles, of which the following is a full, clear, and exact description.

My invention relates to improvements in running-gear which is adapted to carry the body and machinery of a motor-vehicle, although my improved running-gear may be used in connection with any road-vehicle.

The object of my invention is to produce a strong but flexible running-gear constructed in such a way as to form a suitable support for the body of the vehicle and for any necessary machinery and to arrange and adjust the reach or structure connecting the front and rear axles so that any shock or displacement of any one wheel or pair of wheels will be absorbed and taken up by the flexible gear, leaving the body and machinery practically undisturbed.

A further object of my invention is to make this structure as simple and efficient as possible and to provide a swivel or pivotal connection between the front and rear portions of the running-gear, so that if one wheel is raised unduly the reach parts may swivel or turn vertically, so as to not only maintain the body in substantially level position, but also relieve the strain from the reach and accessory parts, the weight of the carriage-body resting on three corners when either one of the wheels is depressed or raised and the carriage-body thus remaining substantially level.

To these ends my invention consists of certain features of construction and combinations of parts, which will be hereinafter described and claimed.

Reference is to be had to the accompanying drawings, forming part of this specification, in which similar figures of reference refer to similar parts throughout the several views.

Figure 4:
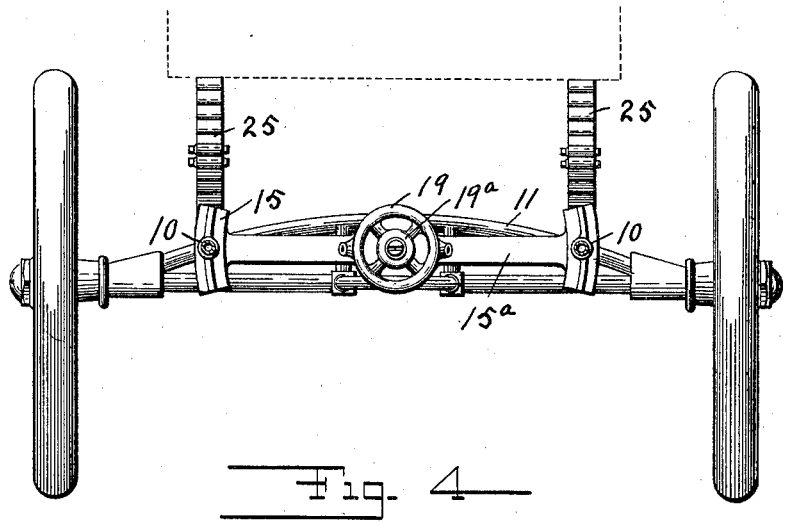
Figures 5, 6:
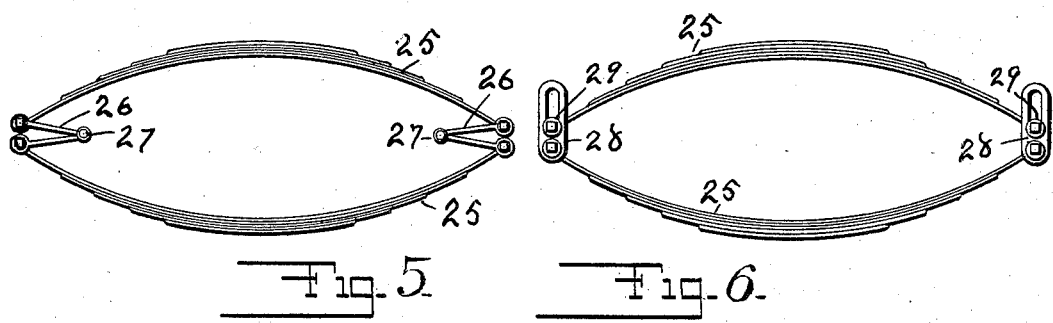

Figure 1 is a side elevation of my improved running-gear as applied to an automobile. Fig. 2 is a plan view of the running-gear with the body of the vehicle and springs removed. Fig. 3 shows one form of flexible connection between the body and running-gear. Fig. 4 is a cross-section on the line 4 4 of Fig. 1. Figs. 5 and 6 are details of forms of springs which can be used to provide for the independent vertical movement of the running-gear in relation to the vehicle-body.

In carrying out my invention I use the usual parallel reach-rods 10, except that each rod runs only half the length of the running-gear, these rods being connected, as usual, to the front and rear bolsters 11, and the bolsters 11 are shown attached in the ordinary way to the axles 12, the latter being supported in the wheels 13. The bolsters 11 are arched, so as to form braces, and no novelty is claimed for them.

It will be understood that any usual form of wheel, axle, and bolster can be used, and the drawing Fig. 2 shows an attachment or yoke $12^a$ on the rear axle, which protects the gear on the said axle; but this feature is not claimed in the present invention.

Where the front and rear sections of the reach-rods 10 meet they merge in abutment plates or heads 14 and 15, which can be perfectly plain on the meeting faces, but which for greater strength are preferably made as shown in Fig. 2, one plate or head 14 having a dovetailed groove 16 arranged vertically in it, but on a curve struck from the center pivot 21 on the reach, and the adjacent plate 15 having a tongue 17 to fit the groove 16 aforesaid. The plates or heads 14 and 15 are each provided with cross-arms $14^a$ and $15^a$, which lie closely together, thus forming, essentially, a single cross-brace, and the arms merge at their inner ends in the spider formed by the two meeting parts 18 and 19, (see Fig. 2,) which have a central hub $18^a$ and $19^a$, through which runs the central pivot $20^a$. The arrangement of the pivot $20^a$ is shown in Fig. 2, where it is elongated, as illustrated, and this long pivot connects with the cross-rods 21, which extend transversely between the reach-rods 10, and the parts are further braced by the diagonal braces 22, which extend on both the front and rear parts from the spider 18 19 to the fittings or collars 23 on the reach-rods 10. By reference to Fig. 2 it will be seen that this makes a very strong structure which is yet capable of turning vertically on the central pivot. The long pivot $20^a$ is journaled in the cross-rod 21, so as to turn freely there, and thus three bearings are made for the pivot, so that the structure is materially stiffened without lessening its flexibility. To still further provide for bracing the reach or running-gear, I have braces 24, which are arranged underneath the reach-rod 10 and extend from the fittings or collars 23 to the axles 12. It will be noticed, therefore, that the braces 21 and 22 stiffen it laterally, so that a very strong yet flexible structure is produced.

Obviously any usual form of spring can be used; but to provide for the vertical movement of any one wheel in reference to the vertical body the springs should either be flexible, so that the two parts can separate vertically, or else a yielding connection between the spring and body should be made. In Figs. 1 and 5 the leaves 25 of a common kind of spring are shown connected by links 26, which are pivoted together, as at 27, and in Fig. 6 the same effect is produced by having links 28 fixed to one spring member or leaf 25, while the opposed member or leaf has a bolt 29 to slide in the link. Perhaps the best method of connection is shown in Fig. 3, where the spring has its two parts rigidly connected together, as usual, and the upper spring member has a piston 30 attached to it, which piston extends upward into a dash-pot 31 in the vehicle-body, so that if the spring drops the piston drops also without transmitting any great shock to the body of the vehicle.

From the foregoing description it will be seen that I provide a very flexible and strong running-gear either end of which can turn vertically in relation to the opposite end and that in connection with this running-gear any usual form of wheels, axles, bolsters, vehicle-body, or necessary machinery can be used.

Having thus described my invention, what I claim as new, and desire to secure by Letters Patent, is—

1. In an apparatus of the kind described, the reach comprising two generally rectangular sections having means at their front and rear ends for connection with the carriage-axles and having bearing-points at the sides and center where they meet, a central pivot connecting the two reach-sections, and bearings for the pivot independent of the central bearing and in line therewith, the said bearings being supported from the sides of the reach-sections.

2. In an apparatus of the kind described, the reach comprising two front and rear sections adapted to be supported in the usual way on the wheels of a vehicle, each section comprising side rods, cross-bars at the ends of the side rods arranged so that the two end cross-bars shall meet, cross-rods connecting the side rods of each section, and a pivot extending through the central meeting-point of the sections and journaled in the cross-rods thereof, substantially as described.

3. A reach, comprising two independent essentially half-sections, each section having parallel side rods adapted to connect with the bolster of a vehicle, a cross-bar at its inner end connecting the side rods, a cross-rod connecting the side rods, said cross-rod being parallel with the aforesaid cross-bar, abutments on the two sides of the reach-sections, said abutments being adapted to engage those of the opposed reach-sections, and a pivot extending through the central meeting portion of the cross-bars of the two reach-sections, said pivot being also supported in the cross-rods of the reach-sections.

4. The combination with the two-part reach having parallel reach-rods, the central spider and the cross-rods connecting the side reach-rods, of a central pivot extending through the spider and journaled on the two cross-rods.

5. In an apparatus of the kind described, the combination with the two-part reach having meeting surfaces near the center, of a central pivot extending through the meeting central portions of the reach so as to permit the end sections to turn vertically in relation to each other, and auxiliary bearings for the central pivot, said auxiliary bearings being independent of the central meeting portions of the reach and in line therewith.

6. The combination with the vehicle axles and bolsters, of the two-part reach connected by a horizontal pivot so that the parts may turn vertically in relation to each other, the upper parts or body portion of the reach-sections being attached to the bolsters, and the braces arranged beneath the body portions of the reach and connecting the reach-sections with the axles.

7. The combination with the axles and the two-part reach connecting them, the parts of the reach being arranged to turn vertically in relation to each other, of the springs and vehicle-body, and a connection between the axles and vehicle-body whereby the body and axles may move vertically independently of each other and of the resilient movement of the spring.

In testimony whereof I have signed my name to this specification in the presence of two subscribing witnesses.

JOHN D. GRIFFEN.

Witnesses:
WARREN B. HUTCHINSON,
ALBERT J. LODER.